(12) United States Patent
Gerban et al.

(10) Patent No.: US 12,437,287 B2
(45) Date of Patent: Oct. 7, 2025

(54) METHOD FOR PERFORMING A PAYMENT PROCESS OF A USER BY A PAYMENT SYSTEM, AS WELL AS A CORRESPONDING PAYMENT SYSTEM

(71) Applicant: MERCEDES-BENZ GROUP AG, Stuttgart (DE)

(72) Inventors: Mark Gerban, Hamburg (DE); Marco Zunino, Schönaich (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 113 days.

(21) Appl. No.: 17/917,045

(22) PCT Filed: Dec. 9, 2020

(86) PCT No.: PCT/EP2020/085156
§ 371 (c)(1),
(2) Date: Oct. 5, 2022

(87) PCT Pub. No.: WO2021/204411
PCT Pub. Date: Oct. 14, 2021

(65) Prior Publication Data
US 2023/0153794 A1    May 18, 2023

Related U.S. Application Data

(60) Provisional application No. 63/005,940, filed on Apr. 6, 2020.

(51) Int. Cl.
*G06Q 20/36* (2012.01)
*G06Q 20/34* (2012.01)
*G06Q 20/40* (2012.01)

(52) U.S. Cl.
CPC ....... *G06Q 20/367* (2013.01); *G06Q 20/3552* (2013.01); *G06Q 20/4014* (2013.01); *G06Q 2220/00* (2013.01)

(58) Field of Classification Search
CPC ............. G06Q 20/367; G06Q 20/3552; G06Q 20/4014
See application file for complete search history.

(56) References Cited

U.S. PATENT DOCUMENTS

| 8,346,670 | B2 * | 1/2013 | Hasson ................ G06Q 20/352 235/382 |
| 2008/0154770 | A1 | 6/2008 | Rutherford et al. |

(Continued)

FOREIGN PATENT DOCUMENTS

| AU | 2015256205 A1 * | 10/2016 | ........... G06Q 20/385 |
| CN | 107408253 A | 11/2017 | |

(Continued)

OTHER PUBLICATIONS

International Search Report and Written Opinion mailed Mar. 15, 2021 in related/corresponding International Application No. PCT/EP2020/085156.

(Continued)

*Primary Examiner* — Neha Patel
*Assistant Examiner* — Davida Lee King
(74) *Attorney, Agent, or Firm* — PATENT PORTFOLIO BUILDERS PLLC

(57) ABSTRACT

A method for performing a payment process involves receiving registration information from the user and transmitting the registration information to a card network of the payment system. The card network generates a payment token dependent on the at least one registration information and a corresponding cryptogram for the payment token. The payment token is received from the card network and stored. Payment data is generated using at least the payment token and omitting the cryptogram. The payment data is transmitted to a merchant usable to conduct a transaction with the merchant by the electronic computing device of the user.

10 Claims, 7 Drawing Sheets

(56) References Cited

U.S. PATENT DOCUMENTS

| | | | |
|---|---|---|---|
| 2017/0193500 A1 | 7/2017 | Hugot | |
| 2017/0323505 A1* | 11/2017 | Gaddam | ................. H04L 63/08 |
| 2018/0069936 A1 | 3/2018 | Kumnick | |
| 2018/0181955 A1* | 6/2018 | Woods | ............... G06Q 20/3224 |
| 2019/0158569 A1* | 5/2019 | Singleton, IV | ....... H04L 67/025 |
| 2019/0260732 A1* | 8/2019 | Narayan | ............. H04L 63/0807 |
| 2020/0302441 A1* | 9/2020 | Collinge | ............... H04L 9/0869 |

FOREIGN PATENT DOCUMENTS

| | | | |
|---|---|---|---|
| CN | 109690597 A | 4/2019 |
| CN | 110100258 A | 8/2019 |
| DE | 102018204504 A1 | 9/2019 |

OTHER PUBLICATIONS

Office Action dated Jun. 10, 2024 in related/corresponding EP Application No. 20 824 170.3.
Wikipedia; "3-D Secure;" Feb. 27, 2013; https://en.wikipedia.org/w/index.php?title=3-D_Secure&oldid=540880667.
Office Action dated Jun. 27, 2025 in related/corresponding CN Application No. 202080099518.9.

* cited by examiner

METHOD FOR PERFORMING A PAYMENT PROCESS OF A USER BY A PAYMENT SYSTEM, AS WELL AS A CORRESPONDING PAYMENT SYSTEM

BACKGROUND AND SUMMARY OF THE INVENTION

Exemplary embodiments of the invention relate to a method for performing a payment process of a user by a payment system, as well as to a corresponding payment system.

People are increasingly relying on their mobile devices to perform transactions, for example, to purchase goods and services. People may perform such transactions while at home, work or while travelling in their vehicles.

However, existing solutions provide limited functionality. For example, if a person wants to make a purchase from a specific business, the person typically needs to download an application for the specific business or connect to a purchase side, for example, a web page, associated with the specific business.

Exemplary embodiments of the invention to a method as well as a payment system, by which a more efficient way of performing a payment process for a user is realized.

One aspect of the invention relates to a method for performing a payment process of a user by a payment system. At least one registration information is received from the user by an electronic computing device of the payment system. At least the one registration information is transmitted to a card network of the payment system by the electronic computing device, wherein the card network generates a payment token dependent on the at least one registration information and a corresponding cryptographic for the payment token. The payment token is received from the card network by the electronic computing device. At least the one payment token is stored in a storing device of the electronic computing device. Payment data are generated by using at least the payment token and by omitting the cryptographic by the electronic computing device. The payment data are transmitted to a merchant is usable to conduct a transaction with the merchant by the electronic computing device.

The payment system, which may also be referred to as a payment tokenization environment, comprises a card network. The card network is a credit card provider, such as Visa, Mastercard, Discover American Express or furthermore. The payment system further may comprise a bank. For example, the bank could be different types of financial institutions that provide credit card accounts, for example, to individual organizations, or payment service provider, as E-wallet services, for example, Paypal, Alipay, Wechat or furthermore. The payment system may include the merchant. The merchant is an entity that accepts credit card payment, for example, for goods and/or services. For example, the merchant may be a gas or charging station, a vehicle parking service, a restaurant, entertainment venue or another type of merchant.

In addition to this, alternative payments methods, mobile networks, or furthermore can also use the payment process. For example, these would be in place of the bank, where the card network may route the transaction to a specific funding source, for example a mobile payment operator (MNO), E-Wallet, Prepaid Card, or Rewards Program, instead of an issuer, for example the bank.

As depicted in this embodiment, in the payment system, the user registers for an account with, for example, a vehicle environment. For example, the user may register for the account when purchasing a new vehicle and/or at another time. The user may register using an application associated with the vehicle manufacturer, for example, an application on the user's smartphone, or using another system without direct customer interaction, such as the card dealer chip terminal or internet enabled devices, for example, another type of computing devices, where, for example, a card dealer chip would submit the customer credentials via internal backend system communication. To register for the account, the user provides payment information, for example, the user's credit card information, which could comprise credit card number, expiration date, a security code or furthermore, and typically some personal information, for example name, address, email, phone number or furthermore. The user may also set up the account directly with the vehicle manufacturer system, for example, via a registration system at a dealership, via an online webpage of the vehicle manufacturer, or furthermore. The user may also set up the account via the vehicle, for example, which communicates with the vehicle manufacturer system. Personal credentials of a user/customer may be used to verify identity of the individual via the payment network to the matching specific funding source for example a Mobile Payment Operator (MNO), E-Wallet, Prepaid Card, Rewards Program. For example, a national identification card or passport can be loaded into a wallet, for example Apple or Google wallet systems, and an identification identifier string can be passed back directly to the payment network from the server side, where the payment network can pass the details back to a bank for purposes such as age verification.

The payment token represents at least the user's payment information without disclosing the user's credit card information or other personal information. In some implementations, the payment token is in the form of a credit card number, but it is not the same as the user's credit card number.

Specifically, the payment token is not stored in combination with the cryptographic/cryptogram, for example, if the cryptogram is provided by the card network to the vehicle environment, as is the case with typical credit card system that uses network tokenization, which may also refer to as an integrated service. As already mentioned, the cryptographic may also be regarded as a cryptogram or a cryptography. The cryptogram, password or authorization credential is only used for transaction authorization by the vehicle backend environment, directed to the card network during a transaction request, where the cryptogram, password or authorization credential is not passed on the merchant environment from the vehicle environment.

Once, the customer registration process has been completed, and the payment token is stored at the vehicle environment, the payment token may be used for making purchase with the merchant, therefore, the payment token is transformed to the payment data, wherein the payment data does not comprise the cryptographic at all. To initiate a purchase, the payment data is provided to the merchant. Additional information may be provided to the merchant as well. The cryptographic, which may also be referred to as a cryptogram, is not forwarded to the merchant. Instead, the cryptogram, password, or other identifiable information, which may be, for example, additional 3DS-information, is sent directly from the vehicle manufacturer system to the card network for payment authorization.

Using the described payment system, the user may pay for goods and services directly from the vehicle without having to have a merchant-specific application, for example, the user's smartphone, and without having to visit a website of the merchant. For example, the user may select an option on the head unit display of the vehicle to initiate the purchase, which may initiate sending at least the payment token to the merchant.

The payment system is a simplified example used to illustrate operation of the payment tokenization technologies described herein. In general, the environment may include any number of customers, vehicle environments, vehicles, card networks, banks, merchants and/or other entities, for example, acquirers.

In some implementations, the payment token is a merchant-specific payment token that is only usable at the particular merchant that the merchant-specific payment token is associated with. For example, the card network may generate one or more merchant-specific tokens and provide them to the vehicle environment for storage and use. In some implementations, the payment token is not specific to any particular merchant and may therefore be used at any merchant that may process credit cards.

The card network receives the payment token and possible additional information from the communication and the authorization information from the communication. The card network determines if the transaction has been authorized, for example, by the user, based on the received information, for example, if there is a match. If a transaction is authorized by the card network, then the card network obtains the credit card information, for example, by decrypting the payment token and sends the credit card information to the bank. If a transaction is not authorized by the card network, for example, if the card network does not receive the authorization information or the received authorization information does not match, then the card network may decline the transaction.

The bank authorizes the transaction using the received credit card information and sends an authorization response back to the card network. The authorization response to the bank may indicate that the transaction has been authorized, or declined, by the bank. If a transaction is authorized by the bank, the card network sends an authorization response to the merchant or to the transaction is completed. If a transaction is not authorized, for example declined by the bank, then the card network may take some other action, for example, send a message to the merchant or acquirer indicating that the transaction was declined.

The payment system operates without the need of passing the cryptographic between the entities. For example, the cryptographic is not needed to perform transaction and the cryptographic does not need to be passed between the vehicle environment, merchant, acquirer, card network, and bank. In addition, the cryptographic does not need to be stored at the vehicle environment, and, even if a cryptographic is stored at the vehicle environment, it is separated from the payment token and is not sent to the merchant or acquirer.

Because a transaction may be performed using the payment token and not the cryptographic, a number of benefits are realized. For example, the entities involved in the transaction do not need to have an integrated service that supports cryptographic, for example, the entities do not need to integrate the credit card token service or the token service from any other card network. This allows merchants that do not have an integrated service to process a transaction using the payment tokenization technologies described herein. For example, any merchant that may process credit cards may process the payment token, because it is in the format of a credit card without needing any additional technology.

The payment tokenization technologies described herein also provide increased security. One type of increased security is provided by the additional authorization originating from the vehicle environment and performed by the card network. For example, in the case of a fraudulent transaction, or in the case of a stolen vehicle, the transaction may be declined, because no authorization is sent by the vehicle environment. In addition, by using a payment token, the credit card information, for example, credit card number, expiration date and security code, may be maintained in a secure environment, for example, at the card network, and not provided to the merchant.

The payment tokenization technologies described herein operate differently from the traditional credit card network that uses an integrated service. With an integrated service, according to the state of the art, a token and a cryptographic are passed to the merchant, and the merchant needs to have an integrated service to process the token and cryptogram. The token and cryptographic are then passed to the acquirer, which also needs to have the integrated services, and then to the card network. In the contrast, the payment tokenization technologies described herein use a different type of payment token that does not need a cryptographic, and therefore a cryptographic is not passed to the merchant, acquirer, or card issuer.

For transmitting the registration information, the user may use a smartphone application, for example, an application associated with the vehicle manufacturer, to provide the registration information, for example, the credit card information, personal information, vehicle information, or furthermore. Using the registration information, an account may be created for the user with the vehicle manufacturer. Excluding the vehicle information, the same process may be applied but is not limited to E-wallets, for example, Applepay, Googlepay, Paypal or furthermore, social networks with single sign-on (SSO) credentials, for example, like Facebook, smart techs, where tokens may be generated and used within these environments and financial institutions.

In an embodiment, the registration information comprises at least one personal information associated with the user and/or at least one credit card information associated with the user. As a part of the account set-up process, the user's credit card information is provided to the card network. Additional information, for example, personal information, vehicle identification number, address details, location, or furthermore, may be provided as well. The card network generates the payment token. The card network stores the relationship between the user's payment and/or the other information, for example, name, address, credit card information, or furthermore, and the generated payment token.

In another embodiment, the electronic computing device is provided in a motor vehicle, and/or a backend server for the motor vehicle, and the payment token and the cryptographic are stored in the motor vehicle and/or the backend server. In particular, the card network may send the payment token to the vehicle environment, which may be the motor vehicle. The card network may send additional information to the vehicle environment as well. The payment token is stored at the motor vehicle. For example, the payment token may be stored by the vehicle manufacturer system, which may be referred to as the backend server, and/or by the motor vehicle itself. The payment token is stored separately at the vehicle environment. The payment token is used to perform the transaction, for example, to make a purchase of goods and/or services. The transaction may be initiated via a variety of computing devices, for example, of the motor vehicle or the backend server. In some implementations, the transaction is initiated via a computing device associated with the motor vehicle, for example, via a head unit of the motor vehicle. The transaction may also be initiated by other computing devices, for example, via a smartphone associated with the user. The advantage of this solution is that the user data in 3DS is usually personal data, and to protect the user's personal data and identities, the vehicle manufacturer may keep the personal data server side, for example, stored at the vehicle manufacturer system, and not share the user's personal information with merchants or enquirers, for example, who could use the personal data for other business purposes not intended by the vehicle manufacturer, such as direct marketing.

According to another advantageous form of configuration, the electronic computing device is provided as a head unit of a motor vehicle. Therefore, the user may interact with the head unit.

Furthermore, it has turned out to be advantageous, if the head unit receives an input of the user to initiate the transaction. In particular, the head unit may be a touchable head unit, and by touching the head unit, the user may initiate the transaction. For example, the user may select between different merchants by touching the selected merchant.

Furthermore, it has turned out to be advantageous, if a single sign-on account is created depending on the registration information by the electronic computing device, and the single sign-on account is stored with the payment data and the single sign-on account is used for paying for a plurality of services of a plurality of merchants, wherein the single sign-on account is used for direct paying without registration of the plurality of merchants. In other words, a map marketplace solution is provided in the context of the motor vehicle. For example, the head unit of the motor vehicle may present a graphical user interface that displays merchants to provide goods and/or services. Using the map marketplace, the user, for example, the owner of the motor vehicle and/or the other users, may select a particular merchant, physically navigate to the particular merchant, and/or make purchases with the particular merchant. When making purchases, the payment tokenization technologies described herein may be used, for example, to pay the merchants directly via the motor vehicle.

In some implementations, a single sign-on and payment environment is implemented where the users may register their account, for example, to the vehicle manufacturer, and store information, for example the payment token, at the motor vehicle or at the backend service. The user may use the vehicle, for example via the head unit, to pay multiple merchants using the stored payment token without using the merchant-specific applications. Using the map marketplace and/or the payment tokenization technologies described herein, the user may use the vehicle to identify and pay merchants directly from the vehicle, using a display of the motor vehicle, and without having to use the user's smartphone or other computing devices.

In another advantageous form of configuration, the account is created as a cloud user profile by a cloud electronic computing device. In particular, the map marketplace uses a cloud user profile, for example, the cloud user profile may be used when the user switches to another car, for example, another car owned by the user, a rental car or furthermore. In this situation, the user's preferences may automatically be ported or synchronized with the new car when locking in or registration. The accessibility of the user account may be possible via an application service, or partner service. For example, if there is a SSO service and work with a merchant, and there is an associated rewards points system, the user can use the stand-alone merchant app to login with the credentials provided via the SSO service and access their rewards the merchant, the customer can link the credentials with the car company app, and reuse these within the automobile ecosystem, for example in the head unit.

In another advantageous embodiment, the transaction is initiated by sending the payment data to the merchant, wherein authorization information is transmitted from the card network to the merchant, and a confirmation information is transmitted from the merchant to the electronic computing device. The initiation of a transaction involves sending the payment token or the payment data to the merchant. The payment data may be sent from the motor vehicle, for example, directly from the motor vehicle to the merchant or via a intermedia system. The payment data may also be sent by the vehicle manufacturer system, for example, directly from the vehicle manufacturer system to the merchant or via an intermedia system. The payment is sent to the merchant without sending the cryptographic. In some implementations, additional information, other than the cryptographic, is sent to the merchant along with the payment data, such as 3DS-information.

In order to authorize the transaction, the merchant sends the payment data to the card network. In some implementations, the merchant sends additional information, such as 3DS-information, along with the payment data to the card network. However, the merchant does not send a cryptographic. In some implementations, the merchant communicates with an acquirer, and it is the acquirer that performs the communication. In typical arrangements, the merchant works with an acquirer to pass card details to the card network to initiate payment, and to collect funds. However, there are situations where the merchant works directly with the card network.

In another advantageous form of configuration, the payment data additionally comprises a personal information of the user and/or a vehicle identification number of a motor vehicle comprising the electronic computing device. In particular, additional information may be provided to the merchant as well, such as the 3D secure information. In particular, the card network then stores the relation between the user's payment data and/or the other information, for example name, address, credit card information or furthermore generates the payment token. During the exchange of the credit card information, the additional customer identifiers, for example, the vehicle identification number, personal information, address details, location, or furthermore, may be sent to the card network and linked with the credit card information. This data may be used for purposes such as, but not limited to, additional verification of the customer with a card network or issuing bank, for example, 3DS-data fulfillment, which is not collected from the merchant or acquirer, or as the authorization credentials from the vehicle manufacturer system backed to the card network during a payment request.

Another aspect of the invention relates to a payment system for performing a payment process of a user, wherein the payment system comprises at least an electronic computing device and a card network, wherein the payment system is configured to perform the methods described above. In particular, the method is performed by the payment system. The payment system may also be referred as the payment tokenization environment.

Further advantages, features, and details of the invention derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

BRIEF DESCRIPTION OF THE DRAWING FIGURES

The drawings show in:

In the figures the same elements or elements having the same function are indicated by the same reference signs.

DETAILED DESCRIPTION

Figure 1:
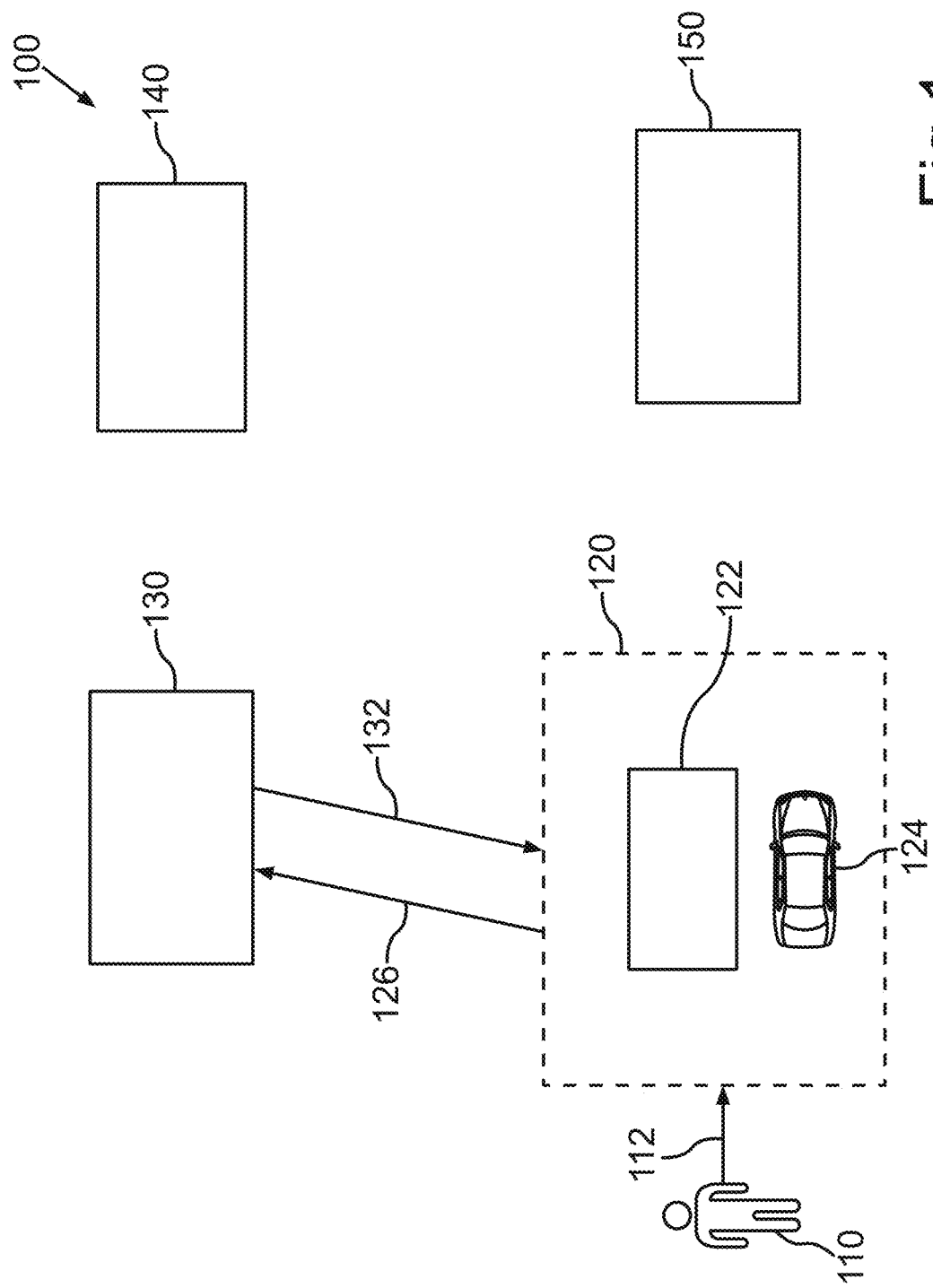
FIG. 1 is a diagram depicting an example of a payment system, including generating and storing payment tokens.

FIG. 1 is diagram depicting an exemplary payment tokenization environment 100, which may also be referred to a payment system 100, including generating and storing a payment token. In general, the exemplary payment tokenization environment 100 includes entities that are involved with generating and storing payment tokens that are used to perform transactions using a credit card network. During the exchange of the credit card information, additional Customer identifiers, for example VIN, Personal Information, Address Details, Location, etc., can be sent to the card network and linked with the customer card information. This data can be used for purposes such as but not limited to additional verification of the customer with the card network or issuing bank, for example 3DS data fulfillment, which is not collected from the merchant or acquirer, or as the authorization credentials required from the vehicle manufacturer system backend to the card network during a payment request.

The example payment tokenization environment 100 includes a vehicle environment 120. The vehicle environment 120 represents the entities that can be involved with setting up and initiating payments using the payment tokenization technologies described herein. The vehicle environment 120 may also be referred to as an electronic computing device. Specifically, the vehicle environment 120 can comprise vehicle manufacturer systems 122. The vehicle manufacturer systems 122 can comprise computing resources of a vehicle manufacturer, such as server computers, networking resources, storage resources, cloud computing resources, backend servers and resources, and/or other types of computing resources. The vehicle environment 120 can also comprise one or more motor vehicles, such as the motor vehicle 124, which may be for example a car, truck, SUV, and/or another type of vehicle.

The example payment tokenization environment 100 includes a card network 130, which is also referred to as a card scheme. The card network 130 is a credit card provider, such as VISA, Mastercard, Discover, American Express, etc.

The example payment tokenization environment 100 includes a bank 140. For example, the bank 140 could be any type of financial institution that provides credit card accounts, for example to individuals or organizations, or a payment service provider, E-Wallet service, like PayPal, Alipay, WeChat, etc.

The exemplary payment tokenization environment 100 includes a merchant 150. The merchant 150 is an entity that accepts credit card payments, for example for goods and/or services. For example, the merchant 150 can be a gas or charging station, a vehicle parking service, a restaurant, entertainment venue, or another type of merchant.

As depicted in the example payment tokenization environment 100, a user 110 registers for an account with the vehicle environment 120, as depicted at with the arrow 112. For example, the user 110 can register for the account when purchasing a new vehicle and/or at another time. The user 110 can register using an app associated with the vehicle manufacturer, for example an app on the user's smart phone, or using another system without direct customer interaction, such as the car dealership terminal or internet enabled device or another type of computing device, where, for example, a car dealership would submit the customer credentials via internal backend system communication. To register for the account, the user 110 provides payment information, for example the user's credit card information, which could comprise credit card number, expiration date, security code, etc., and typically some personal information, for example name, address, email, phone number, etc. The user 110 can also setup the account directly with the vehicle manufacturer systems 122, for example via a registration system at a dealership, via an online web page of the vehicle manufacturer, etc. The user 110 can also setup the account via the motor vehicle 124, for example which communicates with the vehicle manufacturer systems 122.

As part of the account setup process, the user's credit card information is provided to the card network 130, as depicted with the arrow 126. Additional information, for example personal information, VIN, address details, location, etc., can be provided as well. The card network 130 generates a payment token. The card network 130 stores the relationship between the user's payment and/or other information, for example name, address, credit card information, etc. and the generated payment token.

The payment token represents at least the user's payment information without disclosing the user's credit card information or other personal information. In some implementations, the payment token is in the form of a credit card number, but it is not the same as the user's credit card number.

The card network 130 sends the payment token to the vehicle environment 120, as depicted with the arrow 132. The card network 130 can send additional information to the vehicle environment 120 as well. The payment token is stored at the vehicle environment 120. For example, the payment token can be stored by the vehicle manufacturer systems 122, for example at a backend service and/or by the motor vehicle 124. The payment token is stored separately at the vehicle environment 120. Specifically, the payment token is not stored in combination with a cryptogram, which may also be referred as a cryptographic, for example if a cryptogram is provided by the card network 130 to the vehicle environment 120, as is the case with typical credit card systems that use network tokenization, which is also referred to as an integrated service. The cryptogram, password or authorization credential is only used for transaction authorization by the vehicle backend environment, directly to the card network during a transaction request, where the cryptogram, password, or authorization credential will not be passed on to the merchant environment from the vehicle environment.

Once, the customer registration process has been completed, and the payment token is stored at the vehicle environment 120, the payment token can be used for making purchases with the merchant 150. To initiate a purchase, the payment token is provided to the merchant 150. Additional information can be provided to the merchant 150 as well, such as 3D Secure (3DS) information. However, a cryptogram, which may or may not even be available at the vehicle environment 120, is not sent to the merchant 150, as is the case with typical credit card systems that use network tokenization, which is also referred to as an integrated service. Instead, the cryptogram, password, or other identifiable information, which can, for example, be used as additional 3DS information, is sent directly from the vehicle manufacturer systems 122 to the card network 130 for payment authorization Using the example payment tokenization environment 100, the user 110 can pay for goods and services directly from the motor vehicle 124 without having to have a merchant-specific app, for example on the user's smart phone, and without having to visit a web site of the merchant 150. For example, the user 110 can select an option on the head unit display of the motor vehicle 124 to initiate the purchase, which can initiate sending at least the payment token to the merchant 150.

The example payment tokenization environment 100 is a simplified example used to illustrate operation of the payment tokenization technologies described herein. In general, the environment can include any number of customers, vehicle environments, vehicles, card networks, banks, merchants, and/or other entities, for example acquirers.

In some implementations, the payment token is a merchant-specific payment token that is only usable at the particular merchant that the merchant-specific payment token is associated with. For example, the card network 130 can generate one or more merchant-specific tokens and provide them to the vehicle environment 120 for storage and use. In some implementations, the payment token not specific to any particular merchant, and can therefore be used at any merchant 150 that can process credit cards.

Figure 2:
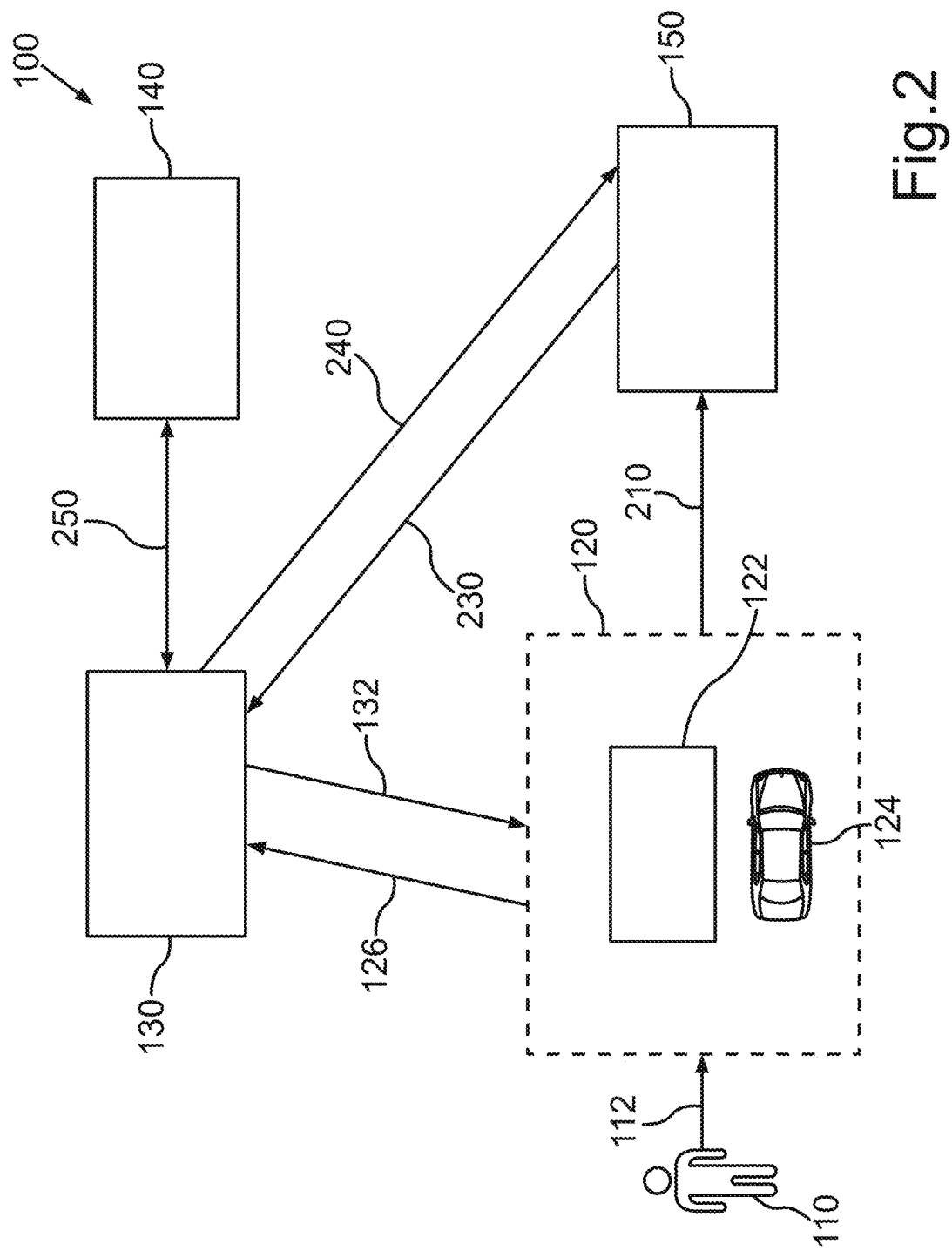
FIG. 2 is a diagram depicting an example of the payment system, including using payment tokens to perform transactions.

FIG. 2 is diagram depicting an example payment tokenization environment 200, which may also be referred to as the payment system, including using a payment token to perform a transaction, for example to make a purchase of goods and/or services. The transaction can be initiated via a variety of computing devices. In some implementations, the transaction is initiated via a computing device associated with the motor vehicle 124 for example via a head unit of the motor vehicle 124. The transaction can also be initiated by other computing devices, for example via a smart phone associated with the user 110.

Initiation of the transaction involves sending the payment token to the merchant 150, as depicted with the arrow 210. The payment token can be sent from the motor vehicle 124, for example directly from the motor vehicle 124 to the merchant 150 or via an intermediary system. The payment token can also be sent by the vehicle manufacturer systems 122, for example directly from the vehicle manufacturer systems 122 to the merchant 150 or via an intermediary system. The payment token is sent to the merchant 150 without sending a cryptogram. In some implementations, additional information, other than a cryptogram, is sent to the merchant 150 along with the payment token, such as 3DS information.

In order to authorize the transaction, the merchant 150 sends the payment token to the card network 130, as depicted with the arrow 230. In some implementations, the merchant 150 sends additional information, such as 3DS information, along with the payment token to the card network 130. However, the merchant 150 does not send a cryptogram.

In some implementations, the merchant 150 communicates with an acquirer (not depicted), and it is the acquirer that performs the communications depicted at 230 and 240. In typical arrangements, the merchant 150 works with an acquirer to pass card details to the card network 130 to initiate payment, and to collect funds. However, there are situations where the merchant 150 works directly with the card network 130.

As part of the authorization process, the vehicle environment 120 performs an additional authorization operation, which is in addition to the merchant 150 and/or acquirer sending the payment token and possible additional information to the card network 130. Specifically, the vehicle environment 120 sends authorization information, for example comprising a security mechanism, such as a one-time password, cryptogram, 3DS information, etc., to the card network 130 to authorize the transaction, as depicted at 220. The authorization information could be sent from the vehicle manufacturer systems 122, from the vehicle 124, and/or from another device. The authorization information is sufficient to allow the card network 130 to match the transaction with the information received from the communication depicted at 230. For example, the authorization information could comprise the user's name, the vehicle VIN, and/or other information that allows the card network 130 to confirm that the transaction is authorized by the user 110 and/or vehicle environment 120, for example which could be via active initiation such as by clicking on a "pay now" icon on the head unit display of the motor vehicle 124 and/or by the user authorizing purchases such as setting up automatic payment of road tolls.

As described above, the authorization information sent by the vehicle environment 120 to the card network 130 can comprise 3DS information, for example version 2.0 or above. Under normal circumstances, when a merchant 150 needs to make a payment and has implemented 3D Secure as a service with their acquirer, they currently need to pass along up to around 110 user data elements including personal through their acquirer, which sends the data back to the merchant 150, which routes the data back to the card issuer, for example the bank 140 or other financial institution, to make a risk based decision to accept or decline the transaction. Not all data elements of the user 110 will be complete from merchants 150, which means there can be a smaller chance of payment acceptance by the issuer. For the payment tokenization technologies described herein, during the original user registration process and payment token exchange (e.g., as depicted in FIG. 1) and/or during the additional authorization operation (e.g., as depicted at 220 in FIG. 2), the vehicle environment 120 can pass any or all of the data elements, for example up to user's 3D Secure data elements, to the card network 130. The card network 130 can combine the received data elements with those received from the merchant 150 and/or acquirer. The combined data elements, for example, which could be some or all of the user's 3D Secure data elements, can then be passed to the issuer, for example to the bank 140, along with the credit card information. The advantage of this solution is that the user data in 3DS is usually personal data, and to protect the user's personal data/identities, the vehicle manufacturer can keep the personal data server side, for example stored at the vehicle manufacturer systems 122, and not share the user's personal information with merchants 150 or acquirers, for example who could use the personal data for other business purposes not intended by vehicle manufacturer, such as direct marketing.

The card network 130 receives the payment token (and possible additional information) from the communication depicted at 230 and the authorization information from the communication depicted at 220. The card network 130 determines if the transaction has been authorized, for example by the user 110, based on the received information, for example if there is a match. If the transaction is authorized by the card network 130, then the card network 130 obtains the credit card information, for example by decrypting the payment token, and sends the credit card information to the bank 140, as depicted with the arrow 250. If the transaction is not authorized by the card network 130, for example if the card network 130 does not receive the authorization information depicted at 220 or the received authorization information does not match, then the card network 130 can decline the transaction.

The bank 140 authorizes the transaction using the received credit card information and sends an authorization response back to the card network 130, as depicted at 250. The authorization response from the bank 140 can indicate that the transaction has been authorized, or declined, by the bank 140. If the transaction is authorized by the bank 140, the card network 130 sends an authorization response to the merchant 150 or to the acquirer, as depicted at 240, and the transaction is completed. If the transaction is not authorized, for example declined, by the bank 140, then card network 130 can take some other action, for example send a message to the merchant 150 or acquirer indicating that the transaction was declined.

The payment tokenization environments 100, 200 depicted in FIGS. 1 and 2 operate without the need for passing a cryptogram between the entities. For example, a cryptogram is not needed to perform transactions and a cryptogram does not need to be passed between the vehicle environment 120, merchant 150, acquirer, card network 130, and bank 140. In addition, a cryptogram does not need to be stored at the vehicle environment 120. And, even if a cryptogram is stored at the vehicle environment 120, it is separate from the payment token and it is not sent to the merchant 150 or acquirer.

Because the transaction can be performed using the payment token and not the cryptogram, a number of benefits are realized. For example, the entities involved in the transaction do not need to have an integrated service that supports cryptograms, for example the entities do not need to integrate the credit card token service or the token service from any card network. This allows merchants 150 that do not have an integrated service to process transactions using the payment tokenization technologies described herein. For example, any merchant 150 that can process credit cards can process the payment token, for example because it is in the format of a credit card, without needing any additional technology.

The payment tokenization technologies described herein also provide increased security. One type of increased security is provided by the additional authorization originating from the vehicle environment 120 and performed by the card network 130. For example, in the case of a fraudulent transaction, or in the case of a stolen vehicle, the transaction can be declined, for example because no authorization is sent by the vehicle environment 120. In addition, by using a payment token, the credit card information, for example credit card number, expiration date, and security code, can be maintained in a secure environment, for example at the card network 130, and not provided to the merchant 150.

The payment tokenization technologies depicted in FIGS. 1 and 2 operate differently from a traditional credit card network that uses an integrated service. With an integrated service, a token and a cryptogram are passed to the merchant 150 and the merchant 150 needs to have an integrated service to process the token and cryptogram. The token and cryptogram are then passed to the acquirer with also needs to have the integrated service and then to the card network. In contrast, the payment tokenization technologies depicted in FIGS. 1 and 2 use a different type of payment token that does not need a cryptogram, and therefore a cryptogram is not passed to the merchant, acquirer, or card issuer.

Figure 3:
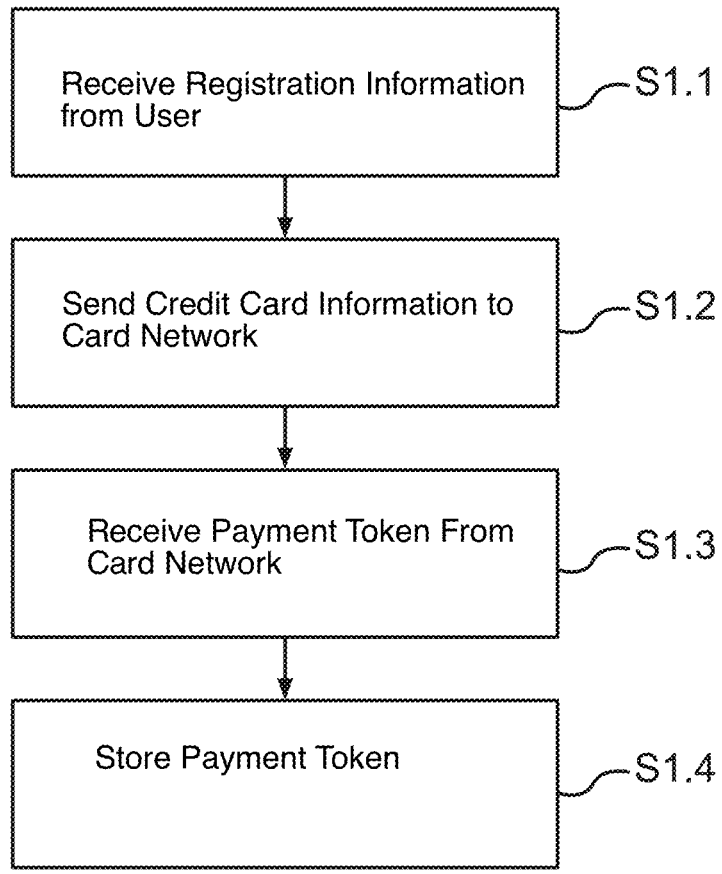
FIG. 3 is a flowchart of an example process for generating a payment token.

FIG. 3 is a flowchart of an example process for generating a payment token. At step S1.1, registration information is received from a user. For example, the user can use a smart phone app, for example an app associated with a vehicle manufacturer, to provide the registration information, for example credit card information, personal information, vehicle information, etc. Using the registration information, an account can be created for the user with the vehicle manufacturer. Excluding the vehicle information, this same process can be applied but is not limited to E-Wallets, for example Apple Pay, Google Pay, PayPal, etc., Social Networks with Single Sign-On (SSO) Credentials, for example Facebook, Smart Tags where tokens can be generated and used within these environments and Financial Institutions.

At step S1.2, credit card information received with the registration information is sent to a card network 130. Additional information can be sent to the card network 130 in addition to the credit card information, such as some or all of the personal information and/or vehicle information.

At step S1.3, a payment token is received from the card network 130.

At step S1.4, the payment token is stored. The payment token can be stored at a motor vehicle 124, at a vehicle manufacturer system 122, for example in a backend server or cloud service associated with the vehicle manufacturer, or at another location including but not limited to E-Wallets, Social Networks, or Smart Tags. The payment token is usable to conduct transactions without using a cryptogram.

Figure 4:
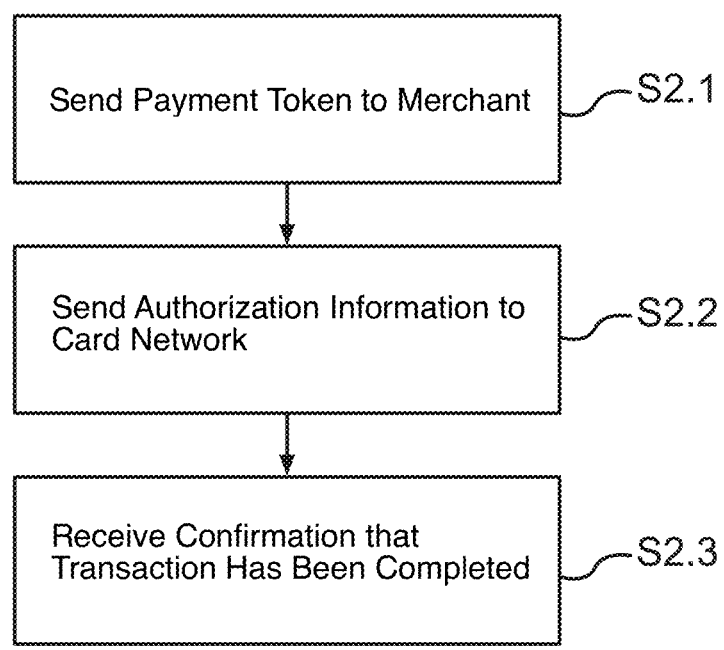
FIG. 4 is a flowchart of an example process for performing a transaction using a payment token.

FIG. 4 is a flowchart of an example process for performing a transaction using a payment token. At step S2.1, a transaction is initiated comprising sending a payment token to a merchant 150. The payment token is sent to the merchant 150 in the form of a credit card without sending a cryptogram. The payment token can be sent to the merchant 150 from a motor vehicle 124 and/or from a vehicle manufacturer system 122.

At step S2.2, authorization information is sent to a card network 130. The authorization information can be sent from the motor vehicle 124 and/or from the vehicle manufacturer system 122. The authorization information can also be sent from an E-Wallet, Social Network, and/or Smart Tag. The authorization information is usable by the card network 130 to match with information, for example the payment token and/or other information for the transaction, received from the merchant 150 and/or acquirer.

At step S2.3, a confirmation that the transaction has been completed is received. For example, the confirmation can indicate that the transaction was successful, and the merchant 150 has been paid. For example, a head unit of a motor vehicle 150 can display the result of the transaction, for example a purchase successful message or a purchase declined message.

In the technologies described herein, a map marketplace solution can be provided in the context of the motor vehicle 124. For example, a head unit of the motor vehicle 124 can present a graphical user interface that displays merchants 150 that provide goods and/or services. Using the map marketplace, a user 110 can select a particular merchant 150, physically navigate to the particular merchant 150, and/or make purchases with the particular merchant 150. When making purchases, the payment tokenization technologies described herein can be used, for example to pay the merchant 150 directly via the vehicle.

In some implementations, a single sign-on and payment environment is implemented where the user 110 can register their account, for example with the vehicle manufacturer, and store information, for example a payment token at the motor vehicle 124 or at the backend service. The user 110 can use the motor vehicle 124, for example via the head unit, to pay multiple merchants 150 using the stored payment token, for example without using merchant-specific apps.

Using the map marketplace and/or payment tokenization technologies described herein, the user 110 can use the motor vehicle 124 to identify and pay merchants 150 directly from the motor vehicle 124, for example using a display of the motor vehicle 124 and without having to use the user's smart phone or other computing device.

In some implementations, the map marketplace uses a cloud user profile. For example, the cloud user profile can be used when the customer switches to another car, for example another car owned by the user 110 a rental car, etc. In this situation the user's preferences can automatically be ported or synced with the new car when logging in or registering.

In the technologies described herein, a recommendation engine can be provided in the context of the motor vehicle 124. For example, the motor vehicle 124 can display recommended merchants 150, for example on a head unit of the motor vehicle 124. The recommendation engine solutions can be used separately or in combination with the map marketplace and/or payment tokenization technologies described herein.

The recommendation engine technologies would include a User Profiling component, and Impression Manager and a Bidder. As the user 110 operates the motor vehicle(s) 124, preferences about his preferred location, driving style, parking behavior, music preferences, products purchased and other data points could be anonymously collected and contribute to form a model of a User Cluster which the user could be associated with. The information about the user and to which User Cluster she belongs could be stored in the motor vehicle 124 and/or in a backend system.

A second component, the Impression Manager, would analyze in real time the motor vehicle 124, user 110 and context information like vehicle status, for example, fuel level, tire pressure, maintenance information and other, location, current time, and other information, which could describe the emotional status of the driver. This component could define the right moment and channel to display a message to the user 110, preventing distraction and ensuring that messages, which are anticipating user needs, would be displayed, in order to reduce the cognitive load needed to interact with the vehicle infotainment system. This component would be aware of the infotainment active context, so that the best channel could be selected to present the message to the user 110, for example push notification, navigation map, search results or media screen or other.

A third component, the MMP Bidder, would receive the trigger from the Impression Manager to engage with the user 110 by presenting content, combining information from the User Profile component to select the best category of content for the impression, and within that category selecting the best matching partners across the several registered with the map marketplace system. In case of more than one partner registered for the same category and with the same matching parameters, a real time bidding would be triggered to select the best match for the content to be displayed to the user 110.

The recommendation engine technologies can be used to generate revenue. In some implementations, one or more of the following operations are performed:

(a) The system identifies the right moment to make suggestion to the vehicle user 110 based on the services that she is more likely to need and when the message would be less distractive (b) The driver is presented an impression which she can act upon, engaging in partners-offered services or content (c) When the driver presses upon the impression, for example fuel station, food ordering, they can be directed to the location via the navigation system or trigger an order for a service, for example booking of parking, food ordering or reservation of car wash service.

Figure 5:
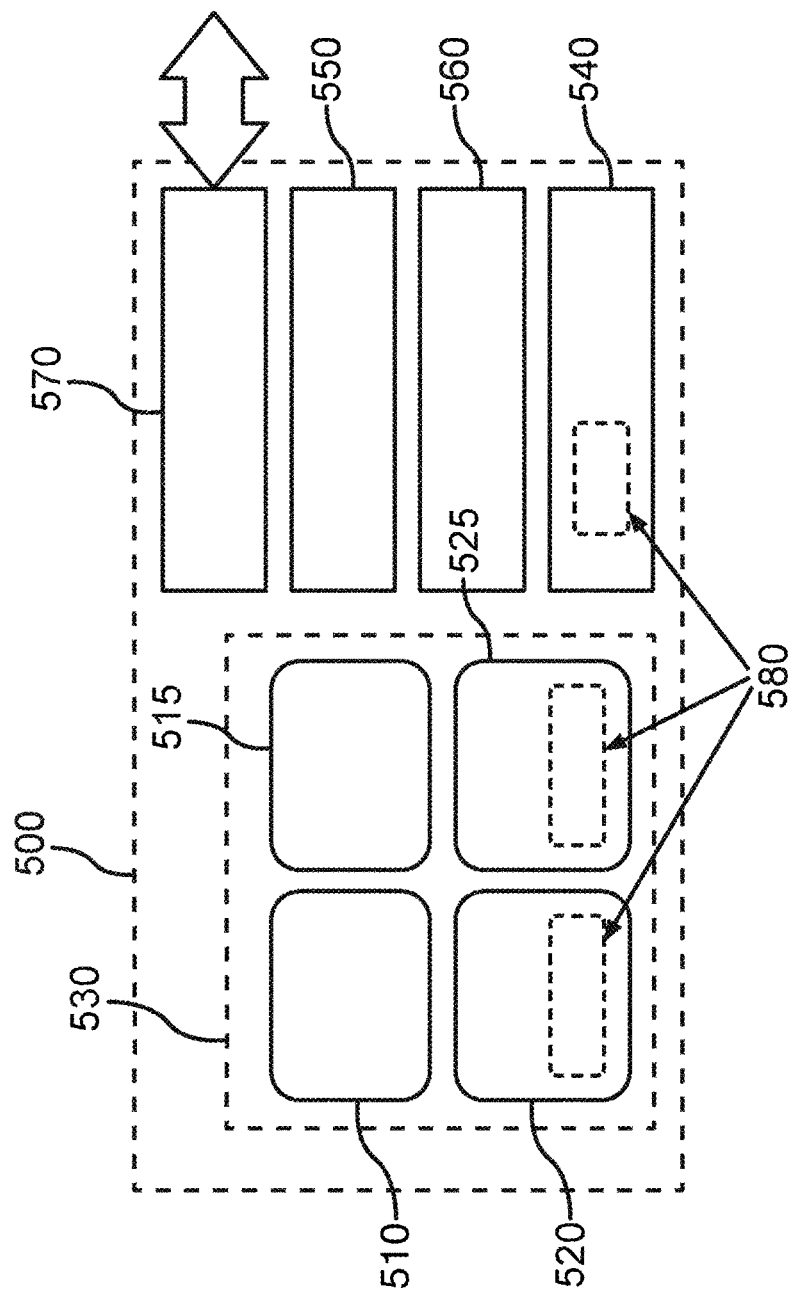
FIG. 5 is a diagram of an example computing system in which some described embodiments can be implemented.

Example Payment Tokenization, Map Marketplace, and Recommendation Engine Technologies FIG. 5 depicts a generalized example of a suitable computing system 500 in which the described technologies may be implemented. The computing system 500 is not intended to suggest any limitation as to scope of use or functionality, as the technologies may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit 510, 515 can be a general-purpose central processing unit (CPU), processor in an application-specific integrated circuit (ASIC) or any other type of processor. In a multi-processing system, multiple processing units 510, 515 execute computer-executable instructions to increase processing power. For example, FIG. 5 shows a central processing unit 510 as well as a graphics processing unit or co-processing unit 515. The tangible memory 520, 525 may be volatile memory, for example registers, cache, RAM, non-volatile memory, for example ROM, EEPROM, flash memory, etc., or some combination of the two, accessible by the processing unit(s) 510, 515. The memory 520, 525 stores software 580 implementing one or more technologies described herein, in the form of computer-executable instructions suitable for execution by the processing unit(s) 510, 515.

The computing system 500 may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more technologies described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 6:
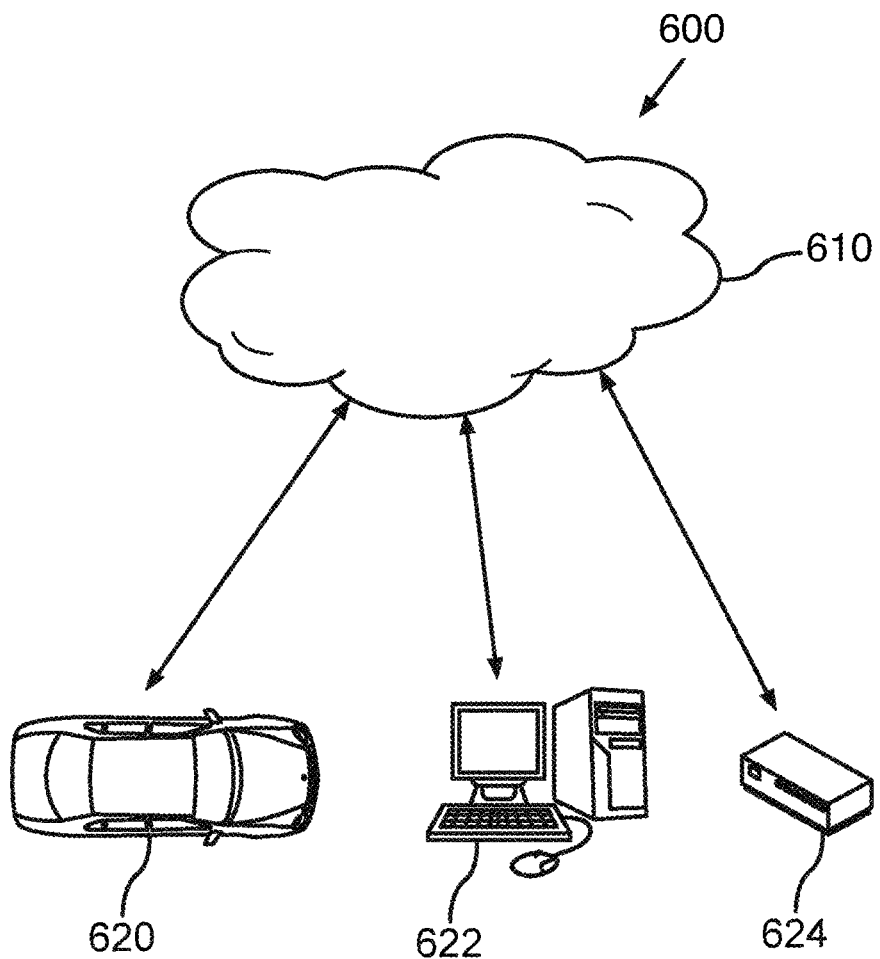
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located, for example provided by a data center of a business or organization, or distributed, for example provided by various computing resources located at different locations, such as different data centers and/or located in different cities or countries.

The cloud computing services 610 are utilized by various types of clients, for example client devices, such as client computing devices. For example, the cloud computing services 610 can be utilized by vehicles 620, for example cars, trucks, and/or other types of vehicles, and/or by various components of the vehicles 620, for example by navigation components, entertainment components, security components, vehicle control components, etc. The cloud computing services 610 can also be utilized by computing devices 622, for example desktop computers, laptop computers, tablets, smart phones, and/or other types of computing devices. The cloud computing services 610 can also be utilized by other types of devices 624, such as Internet of things (IoT) devices.

For example, the various types of clients, for example 620, 622, and 624, can utilize the cloud computing services 610 to perform computing operations, for example messaging, data processing, data storage, and the like.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application such as a remote computing application. Such software can be executed, for example, on a single local computer, for example any suitable commercially available computer or in a network environment, for example via the Internet, a wide-area network, a local-area network, a client-server network such as a cloud computing network, or other such network, using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

Figure 7:
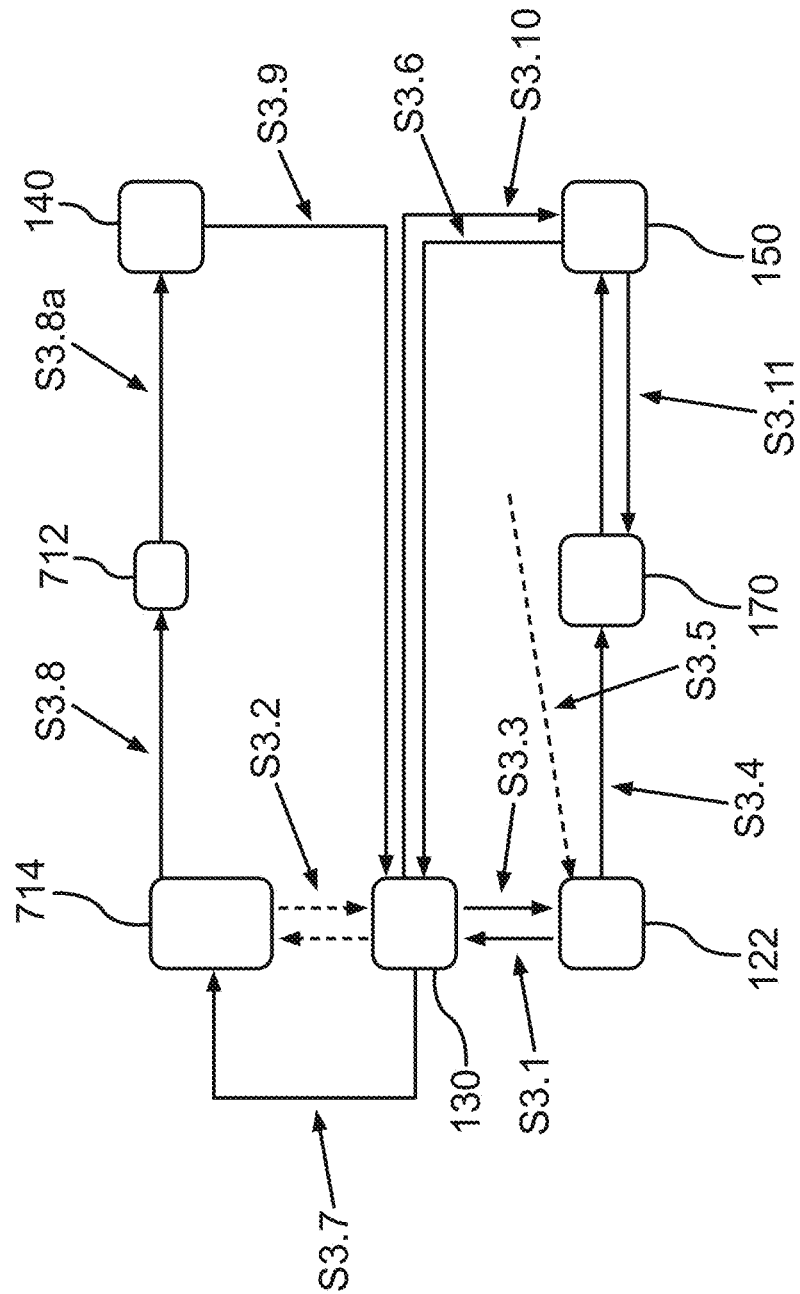
FIG. 7 is a diagram depicting an example of the payment system including using payment tokens to perform transactions.

FIG. 7 shows a diagram depicting an example payment tokenization environment including generating and storing the payment token. FIG. 7 shows a single sign-on account 710, a credit card platform 712, a credit card token vault 714 and a permanent account number 716.

According to the shown embodiment, in a step S3.1, during the user registration, the vehicle manufacturer system 122 sends a credit card number, which may be the permanent account number 716, to the card network 130 with 3DS-data details. In a step S3.2, the credit card platform 712 stores the permanent account number 716, and the personal account number 716 is exchanged for a card network token with the credit card token vault 714. In a step S3.3, the card network 130 returns the token to the vehicle manufacturer system 122, and the cryptographic keys are stored, for example, in the vehicle manufacturer system 122, but is not sent to partners. In a step S3.4, the payment token details are sent to the partners without the cryptographic or personal user data. The token is sent to the single sign-on account 710. In a step S3.5, the token is processed with the partner acquirer, and the vehicle manufacturer system 122 is notified about the cryptographic exchange with the card network 130, along with passing 3DS-data points. In a step S3.6, the token is routed back to the card network 130 from the merchant 150. In the step S3.7, the token is sent to the credit card token vault 714 from the card network 130. In a step S3.8, the credit card token vault 714 matches the card token with original permanent account number 716 and in a step S3.8a, the permanent account number 716 is sent to the issuer, in particular to the bank 140, for authorization. In a step S3.9, the authorization from the bank 140 is accomplished and transmitted to the card network 130. In step S3.10, the card network 130 authorizes the transaction and sends the authorization to the merchant 115. In a step S3.11, the information about the completed transaction is transmitted from the merchant 150 to the single sign-on account 710.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE SIGNS 100 payment tokenization environment
110 user
112 arrow
120 vehicle environment
122 vehicle manufacturer system
124 motor vehicle
126 arrow
130 card network
132 arrow
140 bank
150 merchant
200 payment tokenization environment
210 arrow
220 arrow
230 arrow
240 arrow
250 arrow
500 computing system
510 processing unit
515 processing unit
520 memory
525 memory
530 basic configuration
540 storage
550 input device
560 Output device
570 Communication connection
580 software
600 cloud computing environment
610 cloud computing service
620 vehicle
622 computing devices
624 other types of devices
710 single sign-on account
712 credit card platform
714 credit card token vault
716 permanent account number
S1.1 step S1.2 step
S1.3 step
S1.4 step
S2.1 step
S2.2 step
S2.3 step
S3.1 step
S3.2 step
S3.3. step
S3.4 step
S3.5 step
S3.6 step
S3.7 step
S3.8 step
S3.8a step
S3.9 step
S3.10 step
S3.11 step

The invention claimed is:

1. A method for performing a payment process of a user by a payment system, the method comprising:
    receiving, by an electronic computing device of the payment system, at least one registration information from the user in a vehicle environment;
    transmitting, by the electronic computing device to a card network of the payment system, at least the one registration information, wherein the card network generates a payment token dependent on the at least one registration information and a corresponding cryptogram for the payment token;
    receiving, by the electronic computing device from the card network, the payment token;
    storing, in the electronic computing device, at least the payment token;
    generating, by the electronic computing device, payment data for paying a merchant using at least the payment token and omitting the cryptogram, wherein the payment token is not stored in combination with the cryptogram, and wherein the payment data does not comprise the cryptogram; and
    transmitting, by the electronic computing device to the merchant, the payment data usable to conduct a transaction with the merchant, wherein the cryptogram is not transmitted to the merchant;
    transmitting the cryptogram from a vehicle manufacturer system in the vehicle environment to the card network for authorization of payment for the transaction, wherein the cryptogram is only used for authorizing the payment for the transaction.

2. The method of claim 1, wherein the at least one registration information comprises at least one personal information associated with the user or at least one credit card information associated with the user.

3. The method of claim 1, wherein
    the electronic computing device is provided in a motor vehicle and the payment token and the cryptogram are stored in the motor vehicle,
    the electronic computing device is provided in a backend server for the motor vehicle and the payment token and the cryptogram are stored in the backend server.

4. The method of claim 1, wherein the electronic computing device is a head unit of a motor vehicle.

5. The method of claim 4, wherein the head unit receives an input of the user to initiate the transaction.

6. The method of claim 1, wherein the electronic computing device creates a single sign-on account depending on the at least one registration information by and the single sign-on account is stored with the payment data and the single sign-on account and is used for paying for a plurality of services of a plurality of merchants, wherein the single sign-on account is used for direct payment without registration at the plurality of merchants.

7. The method of claim 6, wherein the single sign-on account is created as a cloud user profile by a cloud electronic computing device.

8. The method of claim 1, wherein the transaction is initiated by sending the payment data to the merchant, wherein authorization information is transmitted from the card network to the merchant and confirmation information is transmitted from the merchant to the electronic computing device.

9. The method of claim 1, wherein the payment data additionally comprises personal information of the user or a vehicle identification number of a motor vehicle comprising the electronic computing device.

10. A payment system for performing a payment process of a user, the payment system comprising:
    at least an electronic computing device in a vehicle environment; and
    a card network,
    wherein the payment system is configured so that
        the electronic computing device receives at least one registration information from the user;
        the electronic computing device transmits to the card network, at least the one registration information, wherein the card network generates a payment token dependent on the at least one registration information and a corresponding cryptogram for the payment token;
        the electronic computing device receives from the card network the payment token;
        the electronic computing device stores at least the payment token;
        the electronic computing device generates payment data for paying a merchant using at least the payment token and omitting the cryptogram, wherein the payment token is not stored in combination with the cryptogram, and wherein the payment data does not comprise the cryptogram; and
        the electronic computing device transmits to the merchant the payment data usable to conduct a transaction with the merchant, wherein the cryptogram is not transmitted to the merchant, and
        a vehicle manufacturer system in the vehicle environment transmits the cryptogram to the card network for authorization of payment for the transaction, wherein the cryptogram is only used for authorizing the payment of the transaction.

* * * * *